(12) United States Patent
Xu et al.

(10) Patent No.: US 7,583,471 B2
(45) Date of Patent: Sep. 1, 2009

(54) MOTOR ASSEMBLY FOR A SMALL SIZED DATA STORAGE SYSTEM

(75) Inventors: Mo Xu, Watsonville, CA (US); YiRen Hong, Singapore (SG); Pohlye Lim, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 548 days.

(21) Appl. No.: 11/456,337

(22) Filed: Jul. 10, 2006

(65) Prior Publication Data

US 2008/0007864 A1    Jan. 10, 2008

(51) Int. Cl.
*G11B 17/00* (2006.01)

(52) U.S. Cl. .................................... 360/97.01

(58) Field of Classification Search .............. 360/97.01, 360/97.02; 310/216, 43, 179, 258, 259
See application file for complete search history.

(56) References Cited

U.S. PATENT DOCUMENTS

| | | | |
|---|---|---|---|
| 4,949,000 A * | 8/1990 | Petersen | 310/179 |
| 6,005,746 A | 12/1999 | Papst | |
| 6,011,670 A | 1/2000 | Balsley, Jr. et al. | |
| 6,075,304 A * | 6/2000 | Nakatsuka | 310/216 |
| 6,282,053 B1 * | 8/2001 | MacLeod et al. | 360/98.07 |
| 6,344,946 B1 | 2/2002 | Papst | |
| 6,445,535 B1 * | 9/2002 | Rehm | 360/99.08 |
| 6,477,013 B1 * | 11/2002 | Kang et al. | 360/236.3 |
| 6,490,123 B1 | 12/2002 | Okunaga et al. | |
| 6,806,601 B2 | 10/2004 | Miyamoto | |
| 6,919,657 B2 * | 7/2005 | Horng et al. | 310/67 R |
| 7,149,051 B2 * | 12/2006 | Yu et al. | 360/97.01 |
| 2002/0131209 A1 * | 9/2002 | Anaya-Dufresne et al. | 360/236.2 |
| 2007/0001539 A1 * | 1/2007 | Hartmann | 310/268 |

FOREIGN PATENT DOCUMENTS

JP        11356016 A    * 12/1999

OTHER PUBLICATIONS

WeiLoon et al., N., "A Motor Housing for Small Form Factor Drives", U.S. Appl. No. 11/224,434, filed Sep. 12, 2005.

* cited by examiner

*Primary Examiner*—Allen T Cao
(74) *Attorney, Agent, or Firm*—Leanne Taveggia Farrell; Westman, Champlin & Kelly, P.A.

(57) ABSTRACT

A base of a data storage system includes a motor assembly. The motor assembly s includes a rotor that extends through an aperture in the base. The aperture extends from an inner surface to an outer surface of the base. The motor assembly also includes a motor stator mounted on the outer surface of the base. The motor stator includes a plurality of stator teeth radially and symmetrically arranged about the aperture in the base which are configured to support stator wires.

20 Claims, 6 Drawing Sheets

MOTOR ASSEMBLY FOR A SMALL SIZED DATA STORAGE SYSTEM

FIELD OF THE INVENTION

The present invention relates generally to data storage systems. In particular, the present invention relates to a motor assembly of a data storage system.

BACKGROUND OF THE INVENTION

A typical data storage system includes a rigid housing having a base and top cover that encloses a variety of components. The components include one or more discs having data surfaces for storage of digital information. The disc(s) are mounted on a rotor of a spindle motor. The spindle motor causes the disc(s) to spin and the data surfaces of the disc(s) to pass under respective aerodynamic bearing disc head sliders. The sliders carry transducers, which write information to and read information from the data surfaces of the discs.

Recently, there has been a rapid increase in the production of smaller and lighter weight disc drives in the disc drive industry. These smaller sized disc drives are typically used in handheld or portable devices, such as cell phones and digital music players. When producing smaller sized disc drives for portable devices, it is often desirable to include a spindle motor with a high electromagnetic (EM) performance level. Spindle motors having high EM performance levels include low power consumption, a high torque constant ($K_t$) and a high voltage margin at low temperatures (to overcome start up problems). It is also desirable to include spindle motors that have small z-heights. Small z-heights allow the disc drive to be as small as possible for use in portable devices. However, in general, the smaller the z-height of a spindle the motor the lower the EM performance level.

In conventional small sized disc drives, the printed circuit board assembly (PCBA) is attached to the base of the disc drive and includes an aperture. The aperture in the PCBA accommodates a housing of the spindle motor such that the z-height of the spindle motor can be as large as possible relative to the thickness of the disc drive. However, a diameter of the aperture in the PCBA can be rather large and, therefore, compromises space needed for holding printed circuit board components. Although a small aperture in the PCBA for a smaller sized spindle motor allows more room for printed circuit board components, a small aperture in the PCBA for a smaller sized spindle motor compromises EM performance levels.

Embodiments of the present invention provide solutions to these and other problems, and offer other advantages over the prior art.

SUMMARY OF THE INVENTION

A data storage system is provided that includes an enclosure having a base and a top cover. The base includes an inner surface, and outer surface and an aperture that extends through the base from the inner surface to the outer surface. The aperture of the base accommodates a rotor of a motor assembly. The motor assembly also includes a motor stator that is mounted to the outer surface of the base. The motor stator includes a plurality of stator teeth that are radially and symmetrically arranged about the aperture in the base and are configured to support stator wires.

The data storage system also includes a printed circuit board assembly (PCBA) that has a first surface and a second surface. The first surface of the PCBA is configured for attachment with the outer surface of the base. The PCBA includes a plurality of openings that extend through the PCBA from the first surface to the second surface. Each opening corresponds with a stator tooth and accommodates stator wires supported by each stator tooth. At least one printed circuit board component is mounted on the first surface of the PCBA between at least two openings.

By mounting parts of a motor assembly to the outer surface of the base and mounting printed circuit board components between openings in the PCBA, the amount of space for a motor assembly is increased while the space needed to accommodate the motor assembly on the PCBA is decreased.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
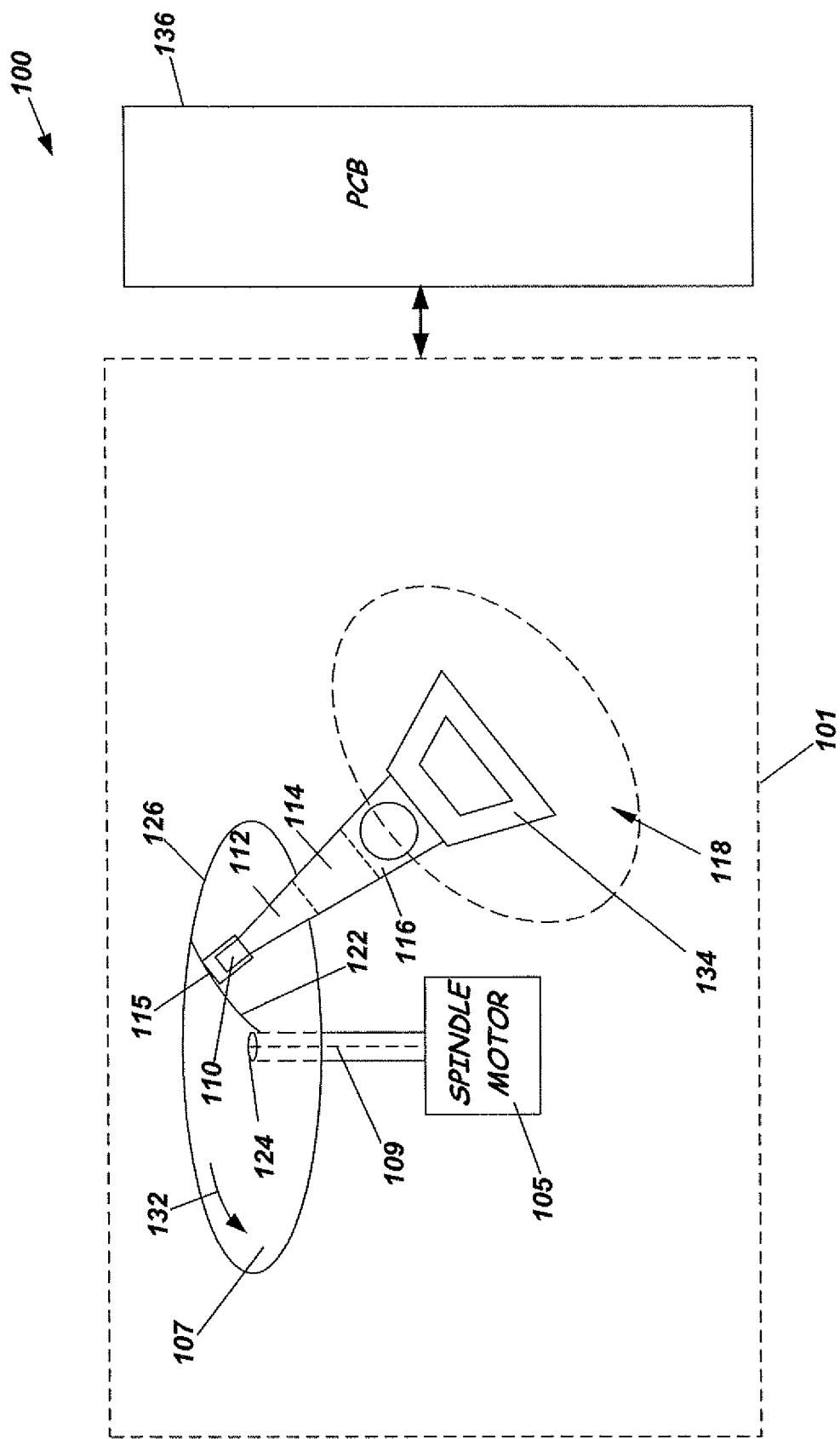
FIG. 1 illustrates a simplified schematic diagram of a disc drive.

FIG. 1 is a simplified schematic diagram of a data storage system 100 in which embodiments of the present invention are useful. Disc drives are common types of data storage systems. Disc drive 100 includes an enclosure 101. Disc drive 100 further includes a disc 107. Those skilled in the art should recognize that disc drive 100 can contain a single disc, as illustrated in FIG. 1, or multiple discs included in a disc pack. As illustrated in FIG. 1, disc 107 is mounted on a spindle motor 105 for rotation about central axis 109. Each disc surface has an associated slider 110. Each slider 110 carries a read/write head for communication with the surface on the disc.

Each slider 110 is supported by a suspension 112 which is in turn attached to a track accessing arm 114 of an actuator mechanism 116. Actuator mechanism 116 is rotated about a shaft by a voice coil 134 of a voice coil motor 118. As voice coil motor 118 rotates actuator mechanism 116, slider 110 moves in an arcuate path 122 between a disc inner diameter 124 and a disc outer diameter 126. While FIG. 1 illustrates one manner of actuating a data head proximate a data storage medium, the present invention, however, is applicable to data storage systems that use other techniques.

Disc drive 100 also includes a printed circuit board assembly (PCBA) 136. PCBA 136 is located outside enclosure 101. In general, PCBA 136 is mounted to an outer surface of enclosure 101. PCBA 136 supports a plurality of printed circuit components (not shown in FIG. 1). The printed circuit components are configured to couple to components enclosed within enclosure 101, such as spindle motor 105, slider 110, actuator mechanism 116 and voice coil motor 118. Although disc drive 100 includes PCBA 136 for supporting a plurality of printed circuit components, other ways of supporting printed circuit components are possible. For example, circuit components can be adhered together for support instead of being mounted to a PCBA for support.

Figure 2:
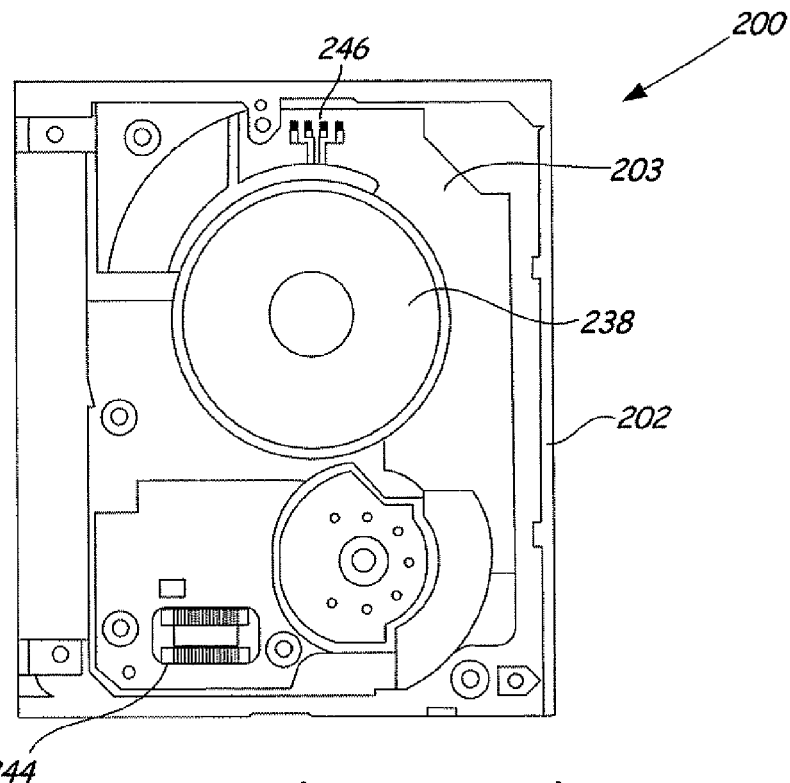
FIG. 2 illustrates a bottom plan view of an enclosure of a disc drive in accordance with the prior art.

FIG. 2 illustrates a bottom plan view of disc drive 200 in accordance with the prior art. Disc drive 200 is a small sized disc drive for use in portable electronic devices, such as cell phones and digital music players. Small sized disc drive 200 includes a base 202 for housing a data storage medium or disc(s). Base 202 includes an outer surface 203 and an inner surface (hidden from view). Base 202 includes a motor housing 238 that houses a spindle motor configured to rotate the data storage disc within disc drive 200. Components of the spindle motor in motor housing 238 face the interior of the disc drive and are attached to the inner surface of the base. Therefore, components of the spindle motor are not visible in FIG. 2.

It is desirable for the spindle motor of small sized disc drive 200 to include a high electromagnetic (EM) performance level. Spindle motors having high EM performance levels have low power consumption, a high torque constant ($K_t$) and a high voltage margin at low temperatures (to overcome start up problems). It is also desirable to for the spindle motor of small sized disc drive 200 to have small z-heights. Small z-heights allow the disc drive to be as small as possible for use in portable devices.

Although not illustrated in FIG. 2, outer surface 203 of base 202 is configured to receive a PCBA. Such a PCBA includes a plurality of printed circuit components configured to couple to components housed in disc drive 200 through electrical connector 244. Connector pads 246 are configured to couple to the PCBA for ultimate connection of the spindle motor housed in motor housing 238 to the PCBA.

Figure 3:
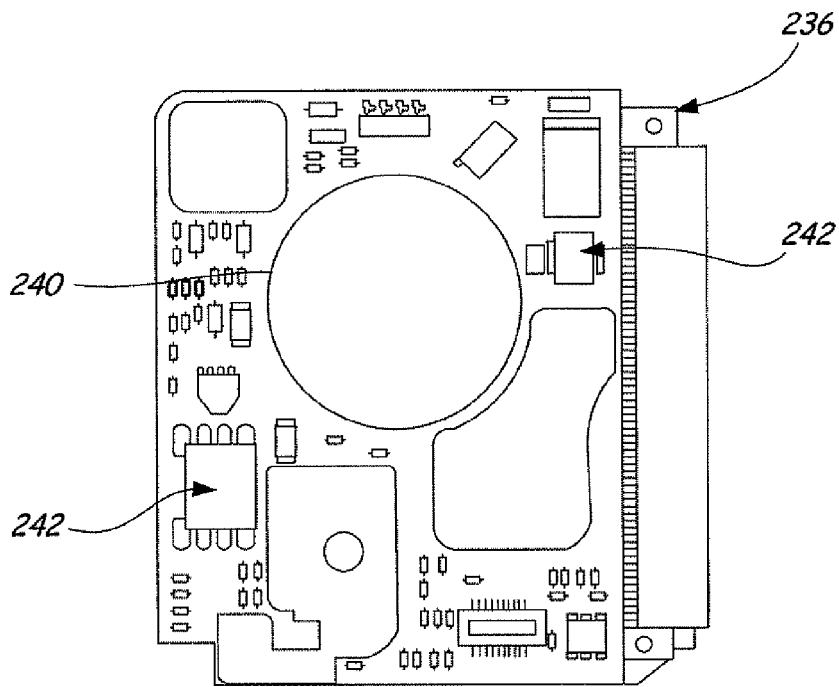
FIG. 3 illustrates a top plan view of a printed circuit board in accordance with the prior art.

FIG. 3 illustrates a top plan view of a PCBA 236 in accordance with the prior art. The top of PCBA 236 is configured for attachment to the outer surface 203 of base 202 (FIG. 2). PCBA 236 includes an aperture 240. Aperture 240 has a rather large diameter to accommodate motor housing 238 (FIG. 2). PCBA 236 also includes a plurality of printed circuit components 242. Printed circuit components 242 are configured for coupling with components housed within disc drive 200 (FIG. 2) through electrical connector 244 (FIG. 2). In FIG. 3, the large diameter of aperture 240 in PCBA 236 illustratively compromises space needed for holding printed circuit board components. However, if disc drive 200 used a smaller sized spindle motor and motor housing 238 to correspondingly reduce the diameter of aperture 240, then EM performance levels of the spindle motor are compromised.

Figure 4:
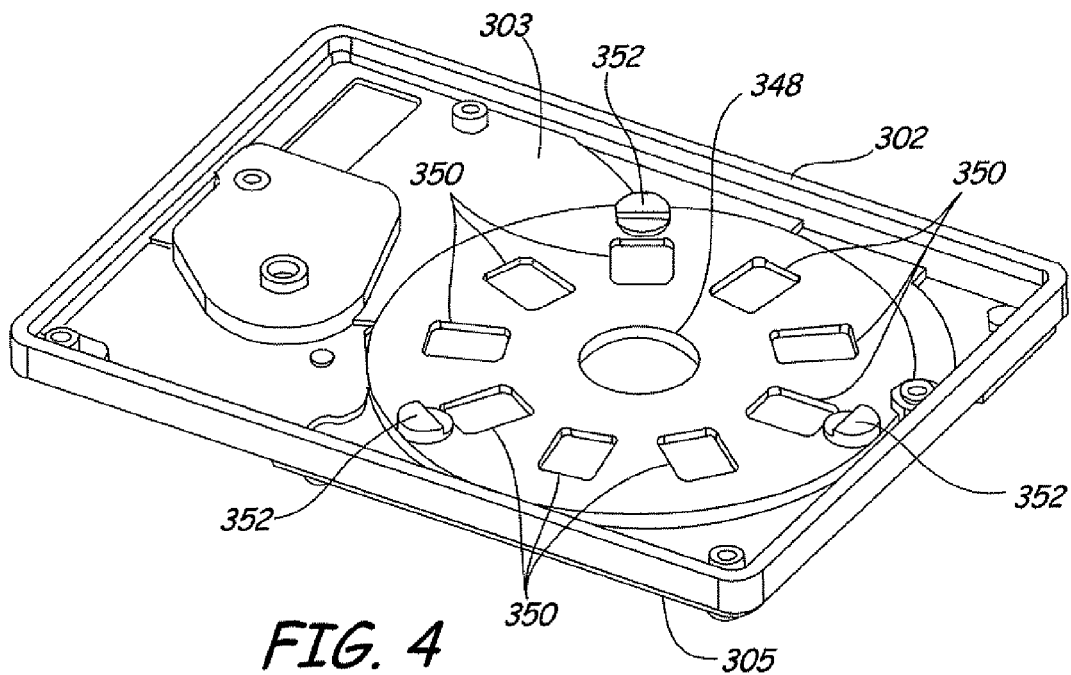
FIG. 4 illustrates a bottom perspective view of a base for a disc drive.

FIG. 4 illustrates a bottom perspective view of a base 302 for a disc drive in accordance with embodiments of the present invention. Base 302 includes an outer surface 303 and an inner surface 305. Base also includes an aperture 348 that extends through the base from inner surface 305 to outer surface 303. Aperture 348 is sized to accommodate a dimension of a rotor of a spindle motor assembly. Outer surface 303 of base 302 includes a plurality of recesses 350 that are recessed into the base from outer surface 303 towards inner surface 305. Recesses 350 are spaced apart from aperture 348 and symmetrically and radially arranged about aperture 348. Recesses 350 are configured to accommodate stator wires of a motor assembly. Therefore, each recess 350 corresponds with a stator tooth of the motor assembly. Outer surface 303 of base 302 also includes a plurality of alignment features 352 that are symmetrically and radially arranged about aperture 348 and recesses 350. Alignment features 352 are configured to control the alignment of a motor stator that is to be mounted to the outer surface 303 of base 302. Aperture 348, recesses 350 and alignment features 352 can easily be integrally formed with base 302 by a process of metal injection molding (MIM), stamping, machining or other type of process. Base 302 can be made of a metallic material such as a soft magnetic material for purposes of magnetic shielding performance. Examples of soft magnetic material include cold-rolled steel or 430-series stainless steel.

Figure 5:
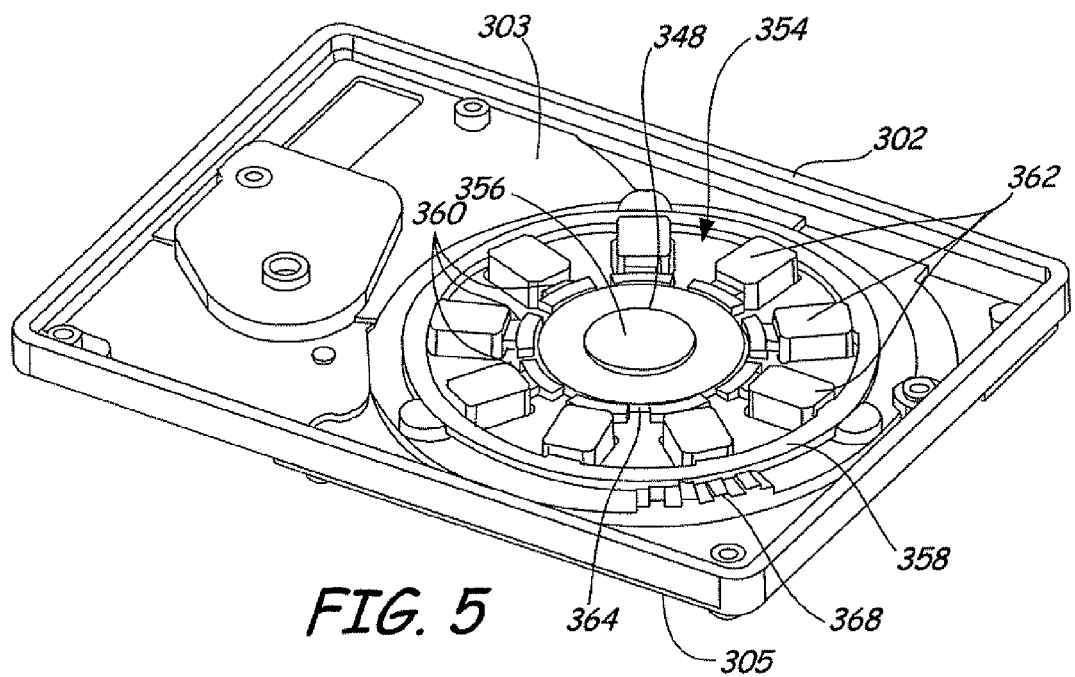
FIG. 5 illustrates a bottom perspective view of the base of FIG. 4 having a motor assembly.
Figure 6:
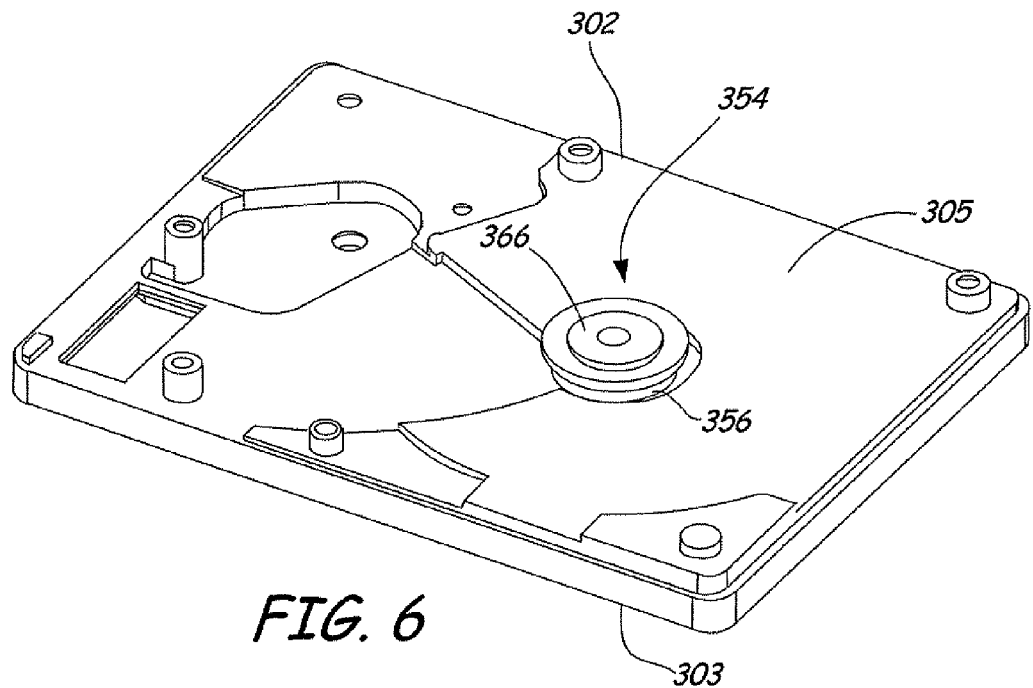
FIG. 6 illustrates a top perspective view of the base of FIG. 4.

FIG. 5 illustrates a bottom perspective view of base 302 of FIG. 4 includes motor assembly 354. FIG. 6 illustrates a top perspective view of base 302 of FIGS. 4 and 5 and having motor assembly 354. Motor assembly 354 includes a rotor 356, a motor stator 358, a plurality of stator teeth 360 that support stator wires 362 and a motor magnet 364.

Rotor 356 extends through aperture 348. In FIG. 6, rotor 356 is illustrated as extending away from the inner surface 305 of base 302 and coupled to a motor hub 366. In FIG. 5, rotor 356 is illustrated as extending away from the outer surface 305 of base 302. Motor stator 358 is mounted on the outer surface 303 of base 302 about aperture 348. Motor stator 358 includes a plurality of stator teeth 360 that are radially and symmetrically arranged about aperture 348 and rotor 356 and are configured to support stator wires 362. Stator teeth 360 that support stator wires 362 are mounted within recesses 350 of outer surface 303. Stator teeth 360 that support stator wires 362 are mounted within recesses 350 with an epoxy. The epoxy creates a large bonding strength between motor stator 358 and base 302. By using epoxy, the motor assembly and base structure have an increased stiffness near the motor area and at the same times damps the structure to reduce vibrational and acoustical problems. Motor magnet 364 is also mounted to outer surface 303 of base 302 between aperture 348 and stator teeth 360. Stator teeth 360 includes a small bend such that the center of motor magnet 364 and an inner diameter of stator teeth 360 are properly aligned. Having stator wires mounted to the outer surface 303 of base 302 eliminates the need to form an opening in base 302 for allowing a flexible printed circuit to attach to PCBA 370 from internal components of the disc drive. Eliminating an opening in base 302 eliminates potential air and humidity leakage problems. In addition, by mounting motor stator 358, motor magnet 364 on the outer surface 303, outgassing of motor assembly 354 into the inside of the disc drive is reduced.

A motor connector block 368 is mounted to the outer surface 303 of base 302 in proximity to an outer diameter of motor stator 358. Motor connector block 368 includes a plurality of soldering pads in which stator phase wires that couple to stator wires 362 are soldered to the soldering pads. A motor connector on a printed circuit board assembly (PCBA) that is coupled to base 302 contact the soldering pads included in motor connector block 368 once the PCBA is installed on base 302.

Figure 7:
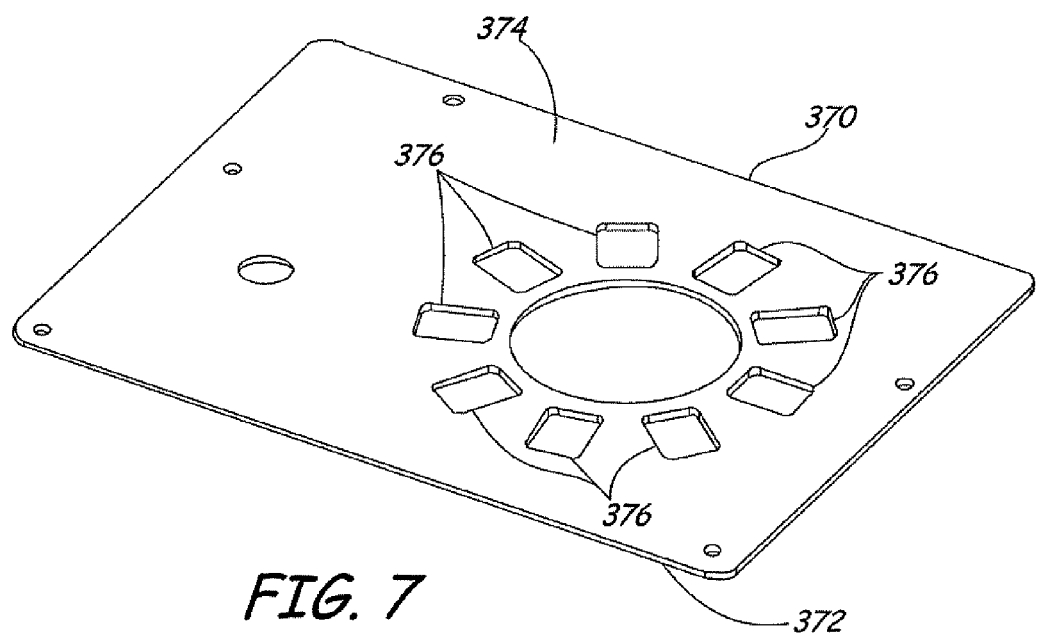
FIG. 7 illustrates a bottom perspective view of a printed circuit board assembly (PCBA).
Figure 8:
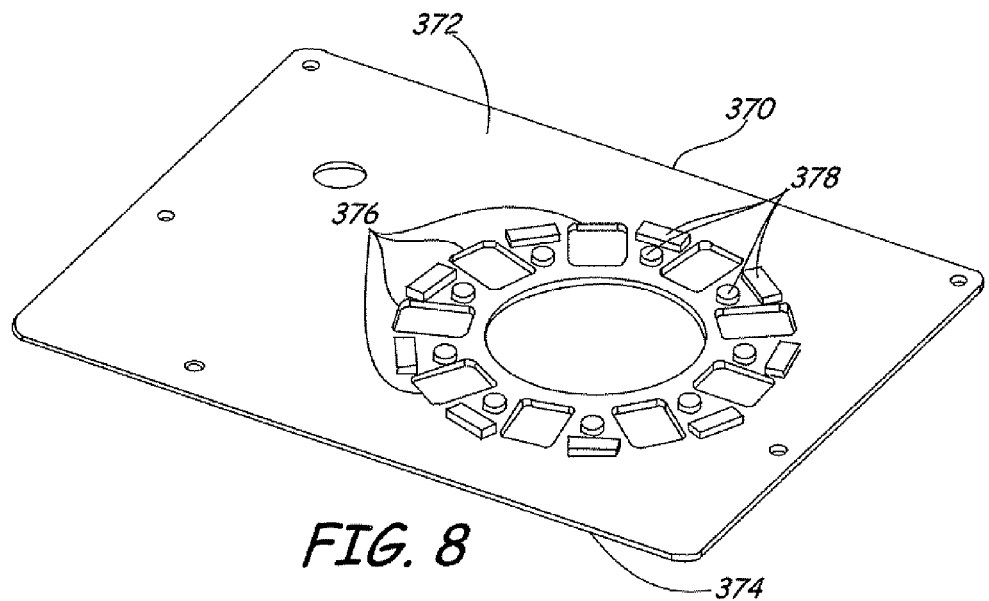
FIG. 8 illustrates a top perspective view of the PCBA of FIG. 7.

FIG. 7 illustrates a bottom perspective view of a printed circuit board assembly (PCBA) 370. FIG. 8 illustrates a top perspective view of PCBA 370. PCBA 370 includes a first surface 372 and a second surface 374. First surface 372 is configured to attach to the outer surface 303 of base 302 as more clearly shown in in the exploded perspective view of disc drive 300 in FIG. 9. Disc drive 300 includes an enclosure 301 having a base 302 and a top cover 307 and PCBA 370. As illustrated in both FIGS. 6 and 7, PCBA 370 includes a plurality of openings 376. Openings 376 extend through PCBA 370 from first surface 372 to second surface 374. Each opening 376 corresponds with one of the plurality of stator teeth 360 and is configured to accommodate stator wires 362 supported by each stator tooth 360. In general, openings 376 allow more space for stator wires 362 on motor stator 358. PCBA 370 includes at least one printed circuit board component 378 mounted on the first surface 372 of PCBA 370 and between at least two of the plurality of openings 376.

As illustrated in FIG. 8, there are two printed circuit board components 378 mounted between each opening 376. Upon PCBA 370 being attached to the outer surface 303 of base 302 the plurality of printed circuit board components 378 are positioned between the plurality of stator teeth 360. Having printed circuit board components 378 mounted to the first surface 372 of PCBA 370 and in between the plurality of openings 376 allows printed circuit board components 378 to fully utilize the space or gaps between stator teeth 360. The space saved by mounting printed circuit board components 378 between the plurality of openings 376 allows an outer diameter of the motor stator 358 to be greatly increased and therefore improve overall electromagnetic performance of the motor assembly. In addition, power consumption, the $K_t$ performance, voltage margin will be much lower and the performance of disc drive 300 at lower temperatures can also be significantly improved.

Figure 9:
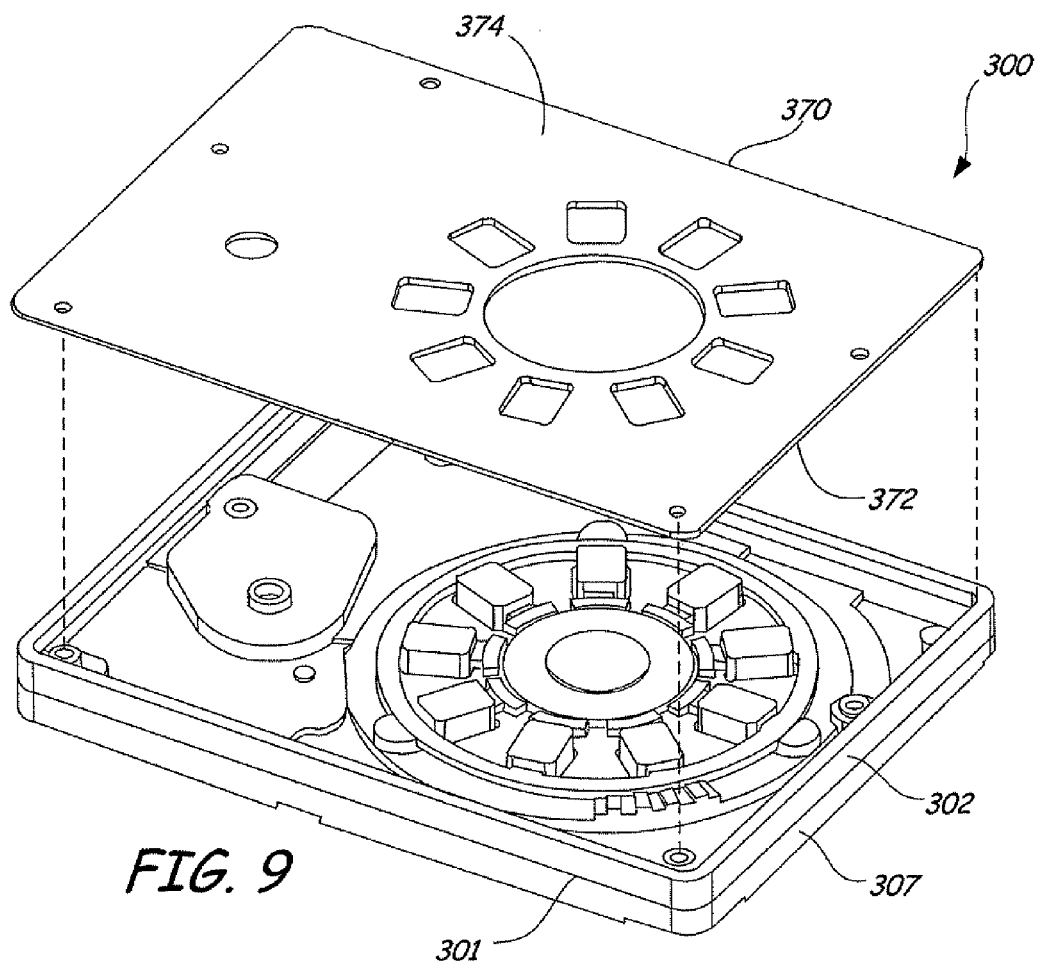
FIG. 9 illustrates a bottom perspective view of a disc drive including the base of FIGS. 4 and 5 and the PCBA of FIG. 7 exploded from the base.

As illustrated in FIGS. 8 and 9, embodiments of the present invention eliminate the need for a motor housing such as motor housing 238 of FIG. 2. The elimination of a motor housing, the addition of openings 376 in PCBA 370 and the mounting of printed circuit board components in between openings 376 effectively increases the amount of space for accommodating a motor assembly in disc drive 300. In particular, an outer diameter of a motor stator can increase by approximately 0.8 mm from a conventional motor stator. An increase in the outer diameter of the motor stator provides better EM performance of the motor.

Figure 10:
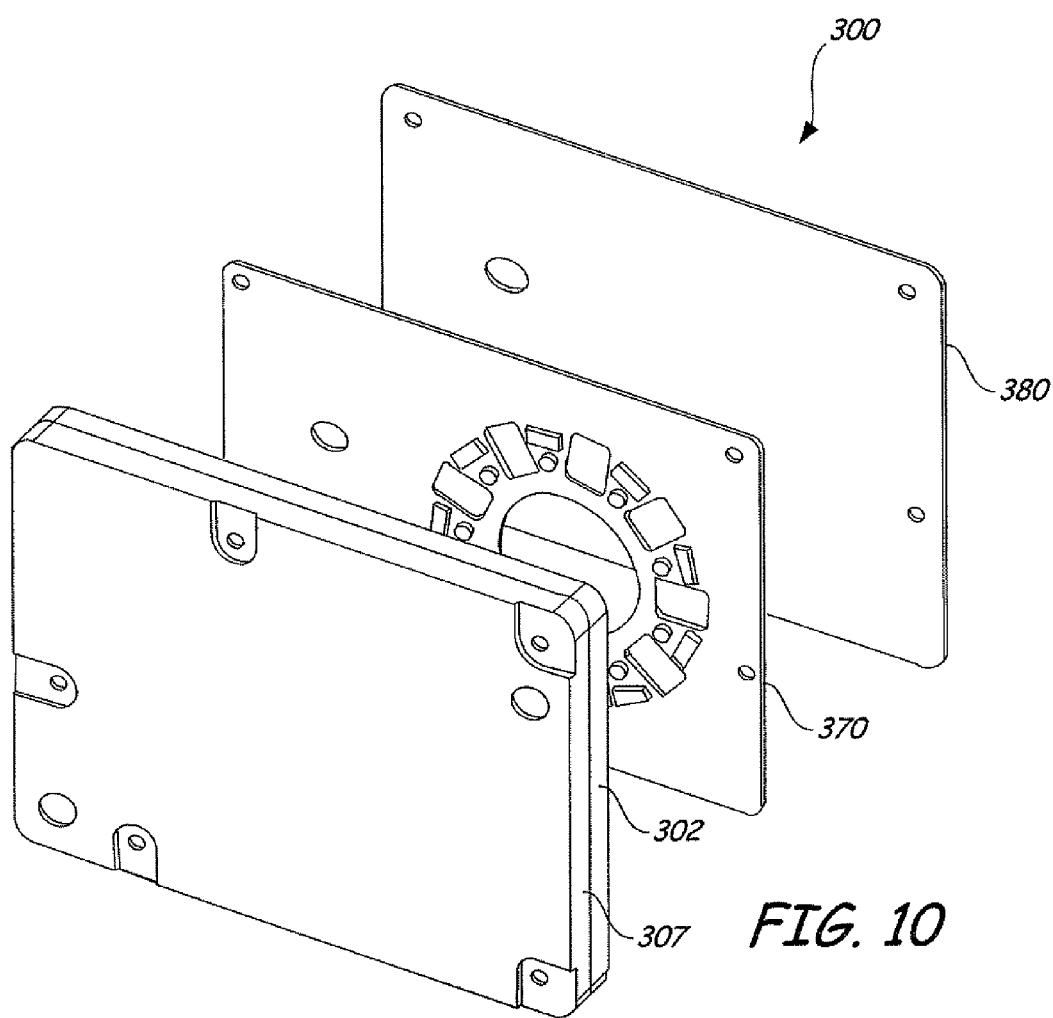
FIG. 10 illustrates an exploded top view of the disc drive of FIG. 9.

FIG. 10 illustrates an exploded top view of disc drive 300 as previously illustrated in FIG. 9. Disc drive 300 includes top cover 301, base 302, PCBA 370 and a motor shield 380. Motor shield 380 is configured to attach to a second surface 374 of PCBA 370. Since stator wires 362 are located within openings 376 of PCBA 370, motor shield 380 is positioned under stator wires 362. There is approximately a gap that is no less than 0.3 mm between motor shield 380 and rotating parts of motor assembly 354. Motor shield 380 is made of a soft magnetic material and serves several functions. For example, motor shield 380 serves the function of normal electrostatic discharge and electromagnetic interference protection for disc drive 300. Motor shield 380 prevents leakage of electromagnetic flux from motor assembly 354. Motor shield 380 also physically protects motor assembly 354 from damage.

Embodiments of the present invention eliminate the need for a conventional shield for shielding motor assembly 354 from storage media within disc drive 300. The elimination of an internal shield further increases the amount of space for a motor assembly in disc drive 300.

In some embodiments, disc drive 300 can include an electromagnetic interference (EMI) layer in between motor stator 358 and PCBA 370. An EMI layer prevents electromagnetic interference from the motor onto components held by PCBA 370. An EMI layer in the present invention can be a soft layer.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the data storage system while maintaining substantially the same functionality without departing from the scope and spirit of the present invention. In addition, although the preferred embodiment described herein is directed to a motor assembly for a data storage system, it will be appreciated by those skilled in the art that the teachings of the present invention can be applied to other types of motor assemblies, without departing from the scope and spirit of the present invention.

What is claimed is:

1. A motor assembly comprising:
   a rotor extending through an aperture in a base of a data storage system, the aperture extends from an inner surface to an outer surface of the base; and
   a motor stator mounted on the outer surface of the base and including a plurality of stator teeth configured to support stator wires, the stator teeth spaced outwardly from and arranged symmetrically about the aperture in the base.

2. The motor assembly of claim 1, wherein the base comprises a plurality of recesses extending from the outer surface of the base towards the inner surface of the base and corresponding with the plurality of stator teeth mounted on the outer surface of the base, each recess configured to accommodate the stator wires supported by the stator teeth.

3. The motor assembly of claim 1, wherein the base comprises a plurality of alignment features mounted to the outer surface of the base, wherein the alignment features are configured to align the motor stator with respect to the aperture in the base.

4. The motor assembly of claim 1, further comprising a motor magnet mounted on the outer surface of the base and positioned about the rotor and between the aperture in the base and the stator teeth.

5. The motor assembly of claim 1, further comprising a motor connector block mounted on the outer surface of the base and positioned outwardly from the motor stator.

6. A data storage system comprising:
   a base having an inner surface, an outer surface and an aperture extending through the base from the inner surface to the outer surface and accommodating a rotor of a motor assembly; and
   a motor stator of the motor assembly mounted on the outer surface of the base and including a plurality of stator teeth configured to support stator wires, the stator teeth spaced outwardly from and arranged symmetrically about the aperture in the base.

7. The data storage system of claim 6, wherein the base comprises a plurality of recesses extending from the outer surface of the base towards the inner surface of the base and corresponding with the plurality of stator teeth mounted on the outer surface of the base, each recess configured to accommodate the stator wires supported by the stator teeth.

8. The data storage system of claim 6, further comprising a printed circuit board assembly having a first surface and a second surface opposite the first surface, wherein the first surface is configured for attachment to the outer surface of the base.

9. The data storage system of claim 8, wherein the printed circuit board assembly comprises a plurality of openings that extend through the printed circuit board assembly from the first surface to the second surface, each opening corresponds with a position of one of the plurality of stator teeth of the motor stator and each opening is configured to accommodate the stator wires supported by the one of the plurality of stator teeth.

10. The data storage system of claim 9, further comprising at least one printed circuit board component mounted on the first surface of the printed circuit board assembly and between at least two of the plurality of openings.

11. The data storage system of claim 9, further comprising a plurality of printed circuit board components, wherein at least one printed circuit board component is mounted on the first surface of the printed circuit board assembly between each of the plurality of openings.

12. The data storage system of claim 8, further comprising a motor shield configured for attachment to a second surface of the printed circuit board assembly opposite the first surface.

13. The data storage system of claim 12, wherein the motor shield is positioned under the stator wires of the motor assembly.

14. The data storage system of claim 6, wherein the base comprises a plurality of alignment features mounted to the outer surface of the base, wherein the alignment features are configured to radially align the motor stator with the aperture in the base.

15. The data storage system of claim 6, further comprising a motor magnet mounted on the outer surface of the base and positioned about the rotor and between the aperture in the base and the stator teeth.

16. The data storage system of claim 6, further comprising a motor connector block mounted on the outer surface of the base and positioned radially outward from the motor stator, wherein the motor connector block includes a plurality of solder pads for receiving the stator wires and for contacting a motor connector on the printed circuit board assembly.

17. A base of a data storage system comprising:
an inner surface;
an outer surface;
an aperture extending through the base from the inner surface to the outer surface and accommodating a rotor of a motor assembly;
a motor stator of the motor assembly mounted on the outer surface of the base and including a plurality of stator teeth configured to support stator wires, the stator teeth spaced outwardly from and arranged symmetrically about the aperture in the base.

18. The base of claim 17, further comprising a plurality of recesses extending from the outer surface of the base towards the inner surface of the base and corresponding with the plurality of stator teeth mounted on the outer surface of the base, each recess is configured to accommodate the stator wires supported by the stator teeth.

19. The base of claim 17, further comprising a motor magnet mounted on the outer surface of the base and positioned about the rotor and between the aperture in the base and the stator teeth.

20. The base of claim 17, further comprising a plurality of alignment features mounted to the outer surface of the base, wherein the alignment features are configured to radially align the motor stator with the aperture in the base.

* * * * *

UNITED STATES PATENT AND TRADEMARK OFFICE
CERTIFICATE OF CORRECTION

PATENT NO. : 7,583,471 B2  Page 1 of 1
APPLICATION NO. : 11/456337
DATED : September 1, 2009
INVENTOR(S) : Mo Xu et al.

It is certified that error appears in the above-identified patent and that said Letters Patent is hereby corrected as shown below:

Title Page Item (57), Abstract,
Line 2, delete "s" after the word assembly.

Signed and Sealed this

Twenty-third Day of February, 2010

David J. Kappos
*Director of the United States Patent and Trademark Office*